(12) United States Patent
Leung et al.

(10) Patent No.: US 6,817,745 B2
(45) Date of Patent: Nov. 16, 2004

(54) OPTICAL MEANS PRIMARILY FOR DECORATIVE APPLICATIONS AND ARTICLES INCLUDING SAME

(75) Inventors: Kwok Shing Leung, Unit C, 22/F, Blk A, 9-11 Cheung Wing Rd, Kwai Chung, New Territories, Hong Kong (CN); Kwok Piu Aaron Yeung, Hong Kong (CN)

(73) Assignee: Kwok Shing Leung, Kwai Chung (HK)

( * ) Notice: Subject to any disclaimer, the term of this patent is extended or adjusted under 35 U.S.C. 154(b) by 0 days.

(21) Appl. No.: 10/262,883

(22) Filed: Oct. 3, 2002

(65) Prior Publication Data

US 2004/0066658 A1 Apr. 8, 2004

(51) Int. Cl.[7] ............................... F21V 8/00; F21V 9/10
(52) U.S. Cl. ....................... 362/555; 362/231; 362/293; 362/552; 362/554; 362/565; 362/583
(58) Field of Search .................................. 362/555, 554, 362/564, 565, 800, 806, 583, 230, 291, 293, 295, 552, 562, 568, 570, 123

(56) References Cited

U.S. PATENT DOCUMENTS

| | | | | |
|---|---|---|---|---|
| 5,720,121 A | * | 2/1998 | Barker | 36/137 |
| 6,361,198 B1 | * | 3/2002 | Reed | 362/554 |
| 6,371,637 B1 | * | 4/2002 | Atchinson et al. | 362/555 |
| 6,415,085 B1 | * | 7/2002 | Graham et al. | 385/102 |
| 6,616,292 B2 | * | 9/2003 | Lin et al. | 362/101 |

* cited by examiner

*Primary Examiner*—Alan Cariaso
*Assistant Examiner*—Guiyoung Lee
(74) *Attorney, Agent, or Firm*—Burns, Doane, Swecker & Mathis, L.L.P.

(57) ABSTRACT

Optical means including an optical source, selection means and optical guiding means, the optical source includes means for producing a plurality of optical regions of different colours, the optical guiding means include a plurality of elongated optical guides for guiding light coupled to the upstream ends of the optical guides to their downstream ends, the selection means includes means for selectively aligning the upstream ends of the optical guides to one or a plurality of the optical regions.

20 Claims, 3 Drawing Sheets

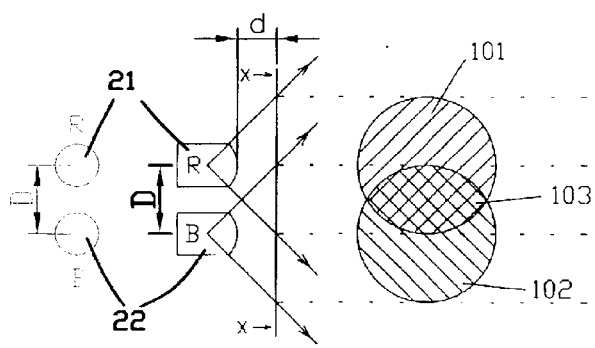
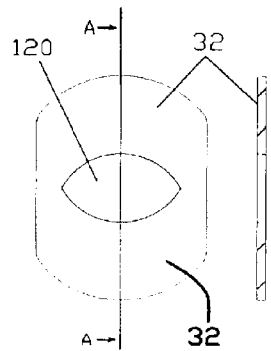
FIG. 3A                    FIG. 3B
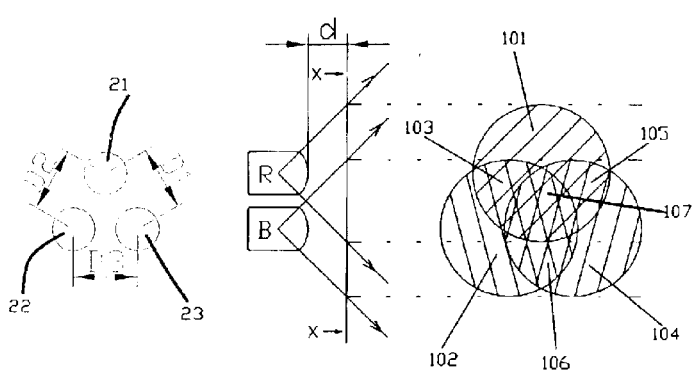
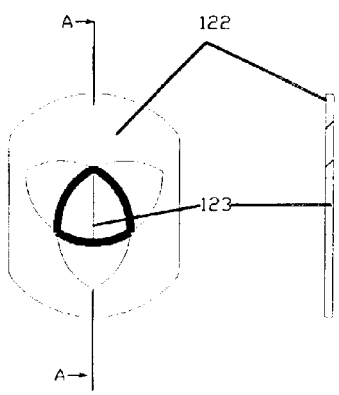
FIG. 4A                    FIG. 4B
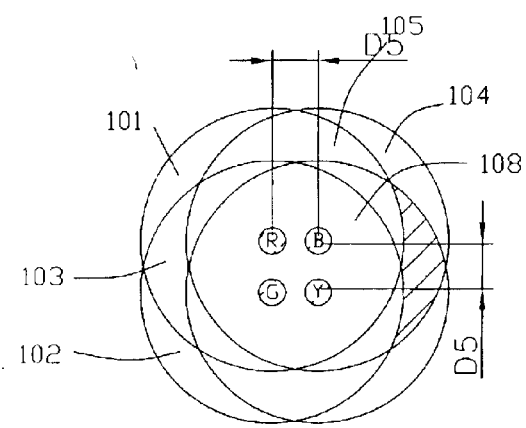
FIG. 5

OPTICAL MEANS PRIMARILY FOR DECORATIVE APPLICATIONS AND ARTICLES INCLUDING SAME

FIELD OF INVENTION

The present invention relates to optical means, schemes and arrangements and, more particularly, to optical means, schemes and arrangements for decorative applications. More specifically, although of course not solely limiting, this invention relates to optical means, schemes and arrangements for decorative applications utilizing elongated optical guides, such as optical fibers. This invention also relates to articles, devices and arrangements incorporating the optical means, schemes and arrangements forming the subject of this present invention.

BACKGROUND OF THE INVENTON

Optical means, schemes and arrangements (collectively "optical means") find wide applications in everyday life. For example, outdoor commercial signboards have been constructed with optical fibers to provide variable colour illuminated displays to attract customers and the external walls of high-rise buildings have been decorated with optical fibers colour changing effects to attract the attention of the public. On items of a smaller scale, optical means have also been utilized in domestic appliances such as refrigerators as well as decorative articles, such as Christmas trees and other seasonal decorations. To enhance the aesthetic appeal of such appliances and decorative articles, the optical means are usually provided with variable colour or colour changing effects.

For example, optical fibers are used in artificial Christmas trees to produce distributed variable colour effects around the Christmas trees. This is done by utilizing a variable optical means comprising a transparent colour disk illuminated by a filament lamp and driven into rotation by an electric motor to produce a colour changing effect at the downstream ends of the optical fibers. However, this type of conventional variable colour optical means is bulky because of the large volume required to accommodate the motor and the rotating colour disk. Furthermore, such an optical means is also energy consuming which is not suitable for use with a portable device or with a stored energy source. In addition, the waste heat generated by the filament lamp creates problems for heat dissipation as well as posing potential fire hazards.

Hence, it will be beneficial if there can be provided improved optical means which alleviate at least some of the shortcomings associated with conventional optical means. Furthermore, in devising such improved optical means, it will be desirable if movable parts are minimized or even eliminated to prolong operating life and reduce the need of regular maintenance.

OBJECT OF THE INVENTION

Accordingly, it is an object of the present invention to provide optical means, schemes and arrangements for generating a multi-colour or a changing colour display which alleviate shortcomings of existing optical means. More particularly, it is an object of the present invention to provide optical means, schemes and arrangements which provide colour mixing or variable colour output with minimal movable parts. Preferably, such optical means does not require an incandescent light source which is highly energy consuming as well as generating excessive heat.

It is a further object of the present invention to provide a compact optical means with a non-incandescent light source for decorative applications utilizing optical fibers for dispersing coloured light generated by the optical means.

Broadly speaking, it is a general object of the present invention to provide a compact, reliable and efficient optical means suitable for use in optical fiber based decorative applications. At a minimum, it is an object of the present invention to provide an useful optical means for the choice of the public.

SUMMARY OF THE INVENTION

According to a first aspect of the present invention, there is provided optical means including an optical source, selection means and optical guiding means, said optical source includes means for producing a plurality of optical regions of different colours, said optical guiding means include a plurality of elongated optical guides for guiding light coupled to the upstream ends of said optical guides to their downstream ends, said selection means includes means for selectively aligning the upstream ends of said optical guides to one or a plurality of said optical regions.

Preferably, said optical source includes at least a first and a second light emitting sources, said first and said second light emitting sources being disposed to form a first optical region, a second optical region and a combination optical region, said first and said second optical regions being formed by projection of light originating respectively from said first light emitting source and said light emitting source, said combination optical region being formed by co-operative projection of light originating from both said first light emitting source and said second light emitting source.

Preferably, said first and said second light emitting sources include light emitting diodes (LEDs) respectively of a first colour and a second colour which are not the same, said first and said second optical regions being generally covered with light of said first and said second colour, said combination optical region being a region covered with light resulting from mixing of light from said first and second light emitting sources.

Preferably, the intensity of light of each of said first and second light emitting diodes are variable.

Preferably, the axes of said first and second LEDs are generally parallel, said first, second and combination optical regions being formed by projection of light emitted from said LEDs, the cumulative area of said optical regions increases with the distance along the direction of light emission from said LEDs.

Preferably, said first and second LEDs are connected to a intensity controlling means for varying the light intensity of said LEDs.

Preferably, the colour of said combination optical region is variable by varying the relative intensity of said first and said second LEDs.

Preferably, each of said first and second LEDs has a viewing angle exceeding 9°.

Preferably, the separation (D) between said first and second LEDs does not exceed 12 mm.

Preferably, the separation between said combination optical region and the light emitting plane of the said LEDs is between D/3 and 3D.

Preferably, said optical guides are PVC optical fibers with a perimeter not exceeding 1.5 πmm.

Preferably, said optical source includes at least an LED and a colour filter.

Preferably, said selection means includes partitioning means defining regions corresponding to at least one of said optical regions.

Preferably, said optical means preferably includes a third light emitting source, said third light emitting source being capable of producing light of a colour different from said first and said second light emitting sources, said third light source emits light to form a third optical region and co-operates with said first and said second light emitting sources to form a tertiary optical region, said selection means includes means to couple the upstream ends of said optical guides to optical regions including said tertiary optical region.

According to a second aspect of the present invention, there is provided articles, for example consumer articles, apparel articles, shoes or decorative articles including the invention of optical means characterized or described under this section or throughout the specification.

BRIEF DESCRIPTION OF THE DRAWINGS

Preferred embodiments of the present invention will be explained in further detail below by way of examples and with reference to the accompanying drawings, in which:

FIG. 3A is a schematic diagram showing the arrangement of an optical source having two LEDs for use in the first preferred embodiment of this invention and the exemplary optical regions viewed from above the LEDs, FIG. 3B illustrates an example of a selection means for use with the embodiment of FIG. 3A, FIG. 4A is a schematic diagram showing the arrangement of an optical source having three LEDs as utilized in the first preferred embodiment of FIG. 1 and the exemplary optical regions viewed from above the LEDs, FIG. 4B illustrates an example of a selection means for use with the embodiment of FIG. 4A, FIG. 5 shows the optical regions of a third preferred embodiment of the present invention with four light emitting sources.

DETAILED DESCRIPTION OF THE PREFERRED EMBODIMENTS

Figure 1:
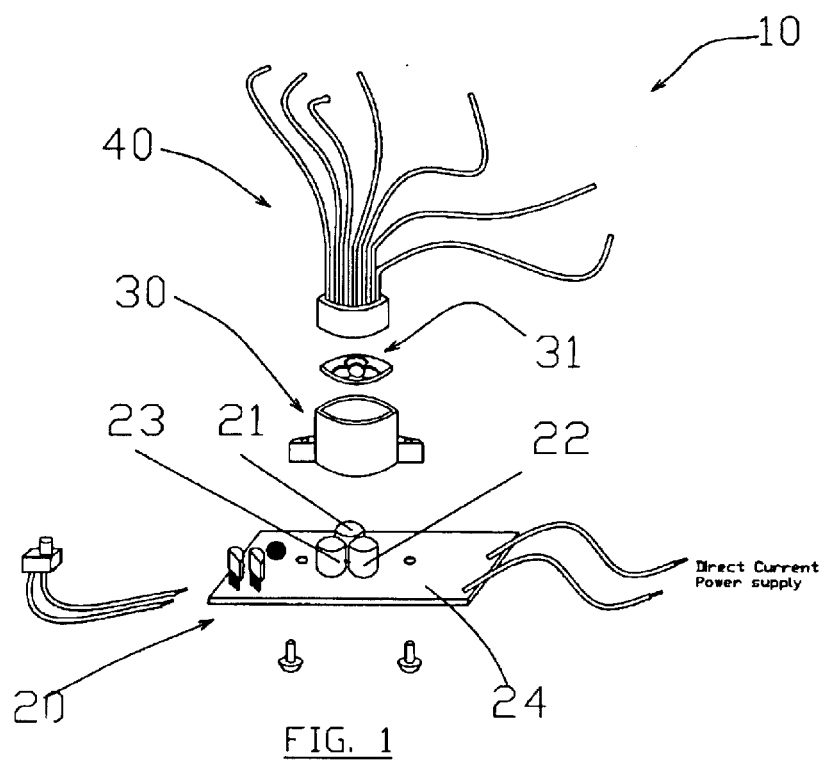
FIG. 1 shows the exploded view of a circuit assembly showing a first preferred embodiment of the present invention.

Referring to FIG. 1, there is shown an exploded view of a first preferred embodiment of the present invention of an optical means. The optical means 10 includes an optical source 20, selection means 30 and optical guiding means 40.

The optical source includes a plurality of light emitting sources which are, for example, light emitting diodes (LEDs) 21, 22 and 23. The three light emitting diodes are preferably LEDs of different colours so that more colour variation can be produced.

The optical guiding means includes a plurality of optical fibers which are preferably optical fibers with a perimeter not exceeding 1.5 πmm for efficient light guidance from the light emitting source 20. For general decorative purposes, PVC flexible fibers are usually used. Each of the optical fibers includes an upstream end and a downstream end such that light coupled to the upstream end can be guided to exit at the downstream end.

To facilitate light coupling, the upstream ends of a plurality of optical fibers are preferably bundled together as a module for convenient alignment with the light emitting source. While only a single bundle of the optical fibers is shown in this Figure, it would be appreciated that a plurality of bundles of the optical fibers can be formed to guide light away from the different coloured optical regions produced by the light emitting source 20 to be explained below.

In the present embodiment, the selection means is formed with a partitioning means having a partitioning grid 31 which defines the boundary of an optical region so that coloured light from that optical region can be collected within that boundary. By aligning the upstream ends of the bundled optical fibers so that they are within the boundary, light originating from that optical region can be coupled to the fibers. More detailed description of the selection means 30 and the light emitting source 20 will be described below. An example of a suitable application of the optical means of FIG. 1 is shown in FIG. 2.

Figure 2:
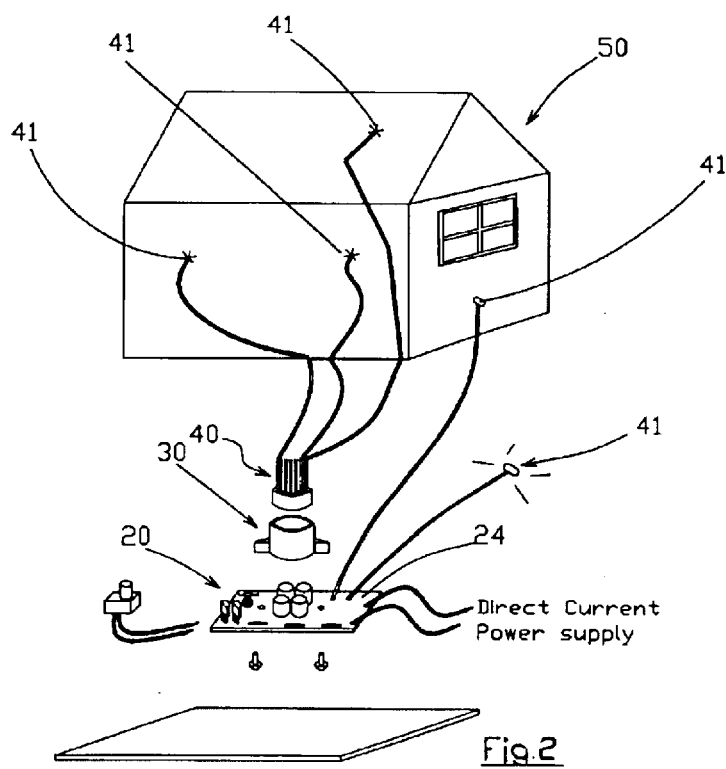
FIG. 2 is an illustration of suitable applications of the embodiment of the present invention.

Referring to FIG. 2, the optical means 10 is arranged so that the downstream ends of the bundled optical fibers are distributed on the surface of the item 50 to be decorated. Since the upstream ends of the optical fibers are coupled to the light emitting source 20, light will be emitted at the downstream ends 41 of the optical fibers and produce visible effects. Where the light emitting source 20 produces a changing colour or changing colours, this changing colour or colours will be seen at the downstream ends of the optical fibers. Thus, where a plurality of optical fiber bundles are formed and the bundles are aligned to specific optical regions of different colours of the light source, the downstream ends of the optical fibers will then emit light of different colours characteristic to the light coupled at their upstream ends, thereby producing aesthetically pleasing light effects. In this specific embodiment, a model house is illustrated as an example of a decorative article. Of course, it will be appreciated that this optical means can be used in or with other items such as telephones, clocks, Christmas decorations such as Christmas trees, photo frames and etc. without loss of generality.

A general principle of the light emitting source 20 of the present invention will be explained in further detail by reference to FIGS. 3A, 3B, 4A and 4B. Referring firstly to FIGS. 3A and 3B, there is shown a first 21 and second 22 light emitting sources which are respectively, for example, red and blue light emitting diodes (LEDs). Of course, it should be understood that these specific colours are only for convenient illustration and should not be considered as restrictive or limiting.

In general, a packaged LED has a characteristic viewing angle which is generally descriptive of the extent or degree of divergence of the LED. Typically, the divergence is generally conical with the imaginary vertex of the cone originating from inside the LED and the divergence is generally symmetrical about the axis of the LED which is also the axis of the cone encapsulating the light emitting from the LED. Conventionally, the viewing angle of a LEDs is the angle between the edges of the cross-section of the characteristic cone of the LED when taken along the line cutting through the vertex and parallel to the axis of the light cone. As is apparent from FIG. 3A, the LEDs 21 and 22 are disposed with their axes generally parallel to each other and with their housing separated by Distance.

By selecting appropriately packaged LEDs and by placing the two LEDs at an appropriate separation, a first optical region, a second optical and a combination optical region will be formed resulting from the projection of light from the LEDs.

In this embodiment, the first 101 and the second 102 optical regions are generally optical regions resulting from the projection of light respectively from the first (red) 21 and the second (blue) 22 LEDs. The combination optical region 103 is formed as a result of the co-operative projection or, in other words, the overlapping, of light from the first 101 and the second 102 optical regions.

Specifically, the first 101 and the second 102 optical regions in the present embodiment are respectively covered with red and blue lights while the combination optical region will be covered with a projection of red, blue or magenta lights, depending on the instantaneous light emissions of the LEDs. For example, the combination optical region will be covered by a magenta light which is a result of the mixing of red and blue light when both the red and blue LEDs are on. Of course, the exact quality of the magenta will depend on the relative quality and intensity of the constituting blue and red light source and can be varied by varying or adjusting the relative intensity or quality of the red and blue light originating from the blue and red LEDs. Usually, the light intensity of LEDs can be varied by adjusting the supplied current. On the other hand, the combination optical region will be covered with light from one of the LEDs if the other LED is off. Thus, the light in the combination optical region may change between red, magenta and blue and the quality of the magenta light can be gradually changed by gradually varying the relative intensity of the light from the red and blue LEDs.

In FIGS. 4A and 4B, a further example of a suitable light source including three light emitting sources is shown. The three light emitting sources including a first 21, a second 22 and a third 23 LEDs which are respectively red, blue and green LEDs. By disposing the LEDs in a manner similar to that of FIGS. 3A and 3B, a plurality of primary optical regions 101 (red), 102 (blue), 104 (green) covered by light originating solely from the LEDs will be formed above the LEDs. In addition, a plurality of secondary optical regions 103 (magenta), 105 (yellow), 106 (cyan), corresponding to the combination optical region in FIGS. 3A and 3B, will be formed at the space above the LED by co-operative projection of a combination of two of the red, green and blue light. For example, the secondary optical region 106 formed by the interaction of the blue and green LEDs will be cyan and the secondary optical region 105 formed by the interaction of the red and green LEDs will be yellow and the secondary optical region 103 formed by the interaction of the red and blue LEDs will be magenta. Of course, the quality of the magenta, yellow and cyan has a colour quality depending on the relative intensity of the constituting light sources. Likewise, when one of the constituting light source is out, the corresponding secondary optical region will be covered solely with the light of the constituting light source which is operating. Furthermore, it will be noted from FIG. 4A that a tertiary optical region 107 formed by the cooperative interaction of the light from the three LEDs will be formed. This tertiary optical region 107 will be white when the intensity of the constituting red, green and blue LEDs are appropriately adjusted according to established principles of physics.

While the co-operative formation of the combination optical region in this embodiment can be fulfilled by using LEDs of non-zero viewing angle, a viewing angle exceeding 90° for each of the component LEDs is preferred for generally parallelly disposed LEDS. Of course, the LEDs can also be aligned in a convergent manner, that is, with their axes converging towards each other, to create optical regions corresponding to the characteristic coloured light of the component LEDs as well as forming a combination, secondary or tertiary optical regions. The parallel alignment of LEDs with a viewing angle exceeding 90° is preferred as the total area of the optical regions generally proportionally increases along the direction which is parallel to the direction of the axis of the LEDs while moving away from the LEDs. With this arrangement, a more flexible, easier and variable alignment and coupling of light to the bundled optical fibers can be achieved.

In FIG. 5, a schematic diagram showing the light projection from four LEDs, namely, red, green, blue and yellow, and the associate primary, secondary, tertiary and quaternary optical regions are shown as a further example. This arrangement is also utilized as an example in FIG. 2.

In arranging the relative disposition of the LEDs and in view of the quality of commonly available LEDs, it is preferred that the maximum distance D between adjacent LEDs does not exceed 12 mm. Furthermore, the distance above the LED at which light is to be coupled to the upstream ends of the optical fibers should preferably be within the range of D/3 and 3D to strike a balance between an appropriate light collection area and the light intensity. For the avoidance of doubt, the preferred distanced (D) is measured from the plane joining the top of the LEDs. In the present examples, the LEDs are mounted on a printed circuit board 24 with a driving circuitry to control the light intensity of the LEDs. By mounting the selection means 30 at an appropriate distance above the PCB and the LEDs, optimal light coupling from the various specific optical regions can be achieved. While the present invention has been explained by reference to a colour mixing scheme utilizing the principles of co-operative projection of coloured LEDs, it will be appreciated that the selection means can also be used in the present invention in connection with a colour filter to define a plurality of optical regions of different colours for optical coupling.

In order to be able to collect light from a specific optical region or specific optical regions without requiring tedious alignments, a selected plurality of the upstream ends of the optical fibers which are intended to be coupled to a specific or prescribed optical region or regions are bundled together so that a single alignment operation will align the upstream ends of all the relevant optical fibers. To further enhance the expedient and accurate alignment of the upstream ends of the optical fibers to the selected and pre-determined optical regions, a selection means 30 is provided.

The selection means 30 is generally a means to provide optical selectivity so that the upstream ends of a selective plurality of optical fibers, which are intended to be coupled to a specific or prescribed optical region, will generally collect light from that specific optical region or regions and, preferably, not from adjacent optical regions.

This selection means 30 in the present invention includes partitioning means, such as a partitioning grid, for defining the boundary or boundaries respectively of one or a plurality of specific or prescribed optical regions from which light is to be coupled to the upstream ends of the optical fibers.

For example, the selection means 30 in the example of FIG. 3A includes a main body member 32 with an upstanding peripheral wall defining an aperture 120 through which the upstream ends of a selected plurality of optical fibers can be coupled to the selected optical region or regions which is the combination optical region 103 in this embodiment. In order to maximize the utilization of light from the combination optical region 103, the aperture or the upstanding peripheral wall is preferably shaped to correspond to the shape of the boundary of the combination optical region 103 as is apparent from FIG. 3A. The upstanding peripheral wall preferably forms a well so that the upstream ends of the optical fibers can be retained by the surrounding wall with the light coupling ends generally aligned towards the combination optical region 103. The upstanding peripheral wall is preferably made of an opaque material, such as metal or plastics, to provide optical isolation so that light from other optical regions is prevented from entering into the compartment or aperture 120 formed by the upstanding peripheral walls. While only a single aperture 120 is shown in this example, it will be appreciated that additional or alternative apertures corresponding to the other optical regions can also be formed without loss of generality.

Referring to the selection means shown in FIG. 4A, the selection member includes a body 122 with an internal upstanding peripheral wall defining an internal aperture 123 corresponding to the tertiary optical region formed as a result of co-operative optical projection from the 3 LEDs. In addition to the aperture corresponding to the tertiary optical region, apertures corresponding to the secondary combination optical regions may also be formed on the selection member with a similar structure so that light can be selectively coupled from the secondary and tertiary optical regions. As the light covering the secondary and tertiary optical regions is a result of the co-operative projection of a plurality of LEDs of different colours, the colour of light covering those secondary and tertiary optical regions can be variable as explained before and can be appropriately utilized to produce enhanced aesthetic appeal. Thus, by aligning a selected plurality of the upstream ends of a pre-determined selected plurality of optical fibers to the corresponding optical regions, the downstream ends of the optical fibers can be distributed according to a predetermined or a plurality of pre-determined patterns to generate the desirable optical patterns effects with colour variations.

Figure 6:
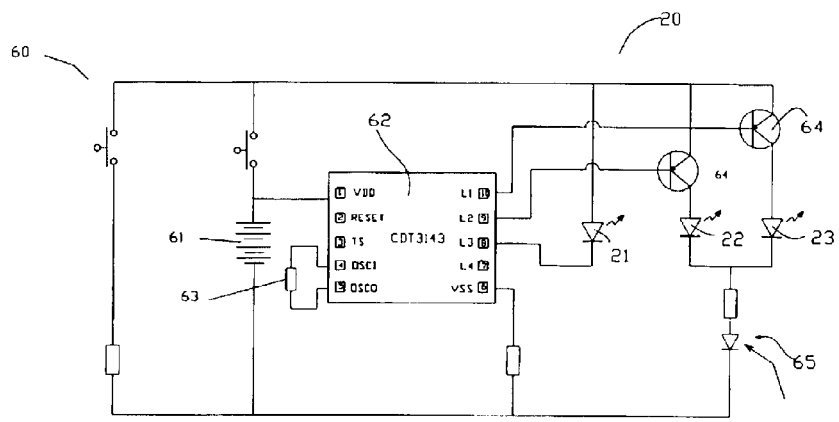
FIG. 6 is a schematic circuit diagram showing an example of a suitable circuit for driving the optical means of FIG. 4A.

Referring to FIG. 6, an example driving circuitry 60 for driving the LED arrangements of FIGS. 1, 4A and 4B is shown. The driving circuitry 60 includes a direct current power supply 61 and a controlling means 62 for varying the intensity of each of the individual LEDs at different predetermined times. The predetermined driving current actuation waveforms for each of the LEDs are preferably different in order to produce continuously changing colour effects by varying the intensity of light emission of each of the LED at different timings. The controlling means in the present example is an integrated circuit 62 numbered CDT 3143 from the company, Chip Design Technology Inc., which is capable of driving a maximum of four LEDs by sending driving current with 90° phase differences between adjacent LEDs. In this specific controller, the frequency of the driving current variation can be varied by the choice of an appropriate resistor for connecting between pins 4 and 5 of the integrated circuit. By producing LED driving currents with certain a phase difference between adjacent LEDs, a continuous variable colour can be produced in the secondary and tertiary optical regions in the manner described above. It will be seen from FIG. 6 that the red, green and blue LEDs are respectively connected to the pin numbers 8, 9 and 10 of the integrated circuit and each of the blue and red LEDs are connected to the power supply via a switching transistor 64.

An additional diode 65 is connected to the series combination of the blue and green LEDs for electrostatic protection since such LEDs are known to be electrostatic sensitive.

Figure 7:
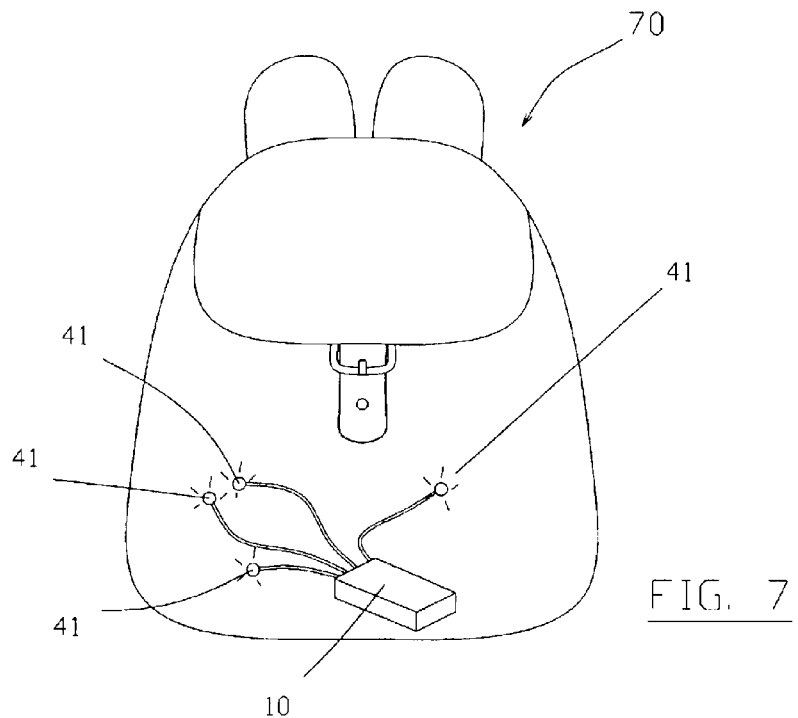
FIG. 7 is a schematic drawing showing an article in the form of a back-bag or rucksack including optical means of the present invention.

FIG. 7 illustrates an example of the application of optical means of the present invention on an article 70 which is a back-bag or rucksack as a convenient example. Of course, the present invention can form part of other articles, for example, shoes, apparel or other consumer items without loss of generality.

While the present invention has been explained by reference to the preferred embodiments described above, it will be appreciated that the embodiments are only examples provided to illustrate the present invention and are not meant to be restrictive on the scope and spirit of the present invention. This invention should be determined from the general principles and spirit of the invention as described above. In particular, variations or modifications which are obvious or trivial to persons skilled in the art, as well as improvements made on the basis of the present invention, should be considered as falling within the scope and boundary of the present invention. Furthermore, while the present invention has been explained by reference to decorative items using LEDs coupled with optical fibers, it should be appreciated that the invention can apply, whether with or without modification, to other optical means, schemes and arrangements without loss of generality.

What is claimed is:

1. Optical means comprising an optical source, selection means and optical guiding means, said optical source comprising means for producing a plurality of optical regions of different colours, said optical source being disposed so that light originating from said plurality of optical regions is projected towards said optical guiding means and portions of light projected from said plurality of optical regions of different colours are combined to form a region of projected light of combined colours, said optical guiding means comprising a plurality of elongated optical guides for guiding light coupled to the upstream ends of said optical guides to their downstream ends, said selection means comprising partitioning means adapted for selecting light of a selected colour from said plurality of optical regions of different colours or from said region of combined colours and means for selectively aligning the upstream ends of said optical guides to said partitioning means.

2. Optical means according to claim 1, wherein said optical source includes at least a first and a second light emitting sources, said first and said second light emitting sources being disposed to form a first optical region, a second optical region and a combination optical region, said first and said second optical regions being formed by projection of light originating respectively from said first light emitting source and said second light emitting source, said combination optical region being formed by co-operative projection of light originating from both said first light emitting source and said second light emitting source.

3. Optical means according to claim 2, wherein said optical guides are PVC optical fibers with a perimeter not exceeding 1.5 πmm.

4. Optical means according to claim 2, wherein said optical source includes at least an LED assembly with a multi-colour output.

5. An article, means or arrangement including the optical means of claim 2.

6. An article according to claim 5, said article being a Christmas tree, whether natural or artificial.

7. Optical means according to claim 2, wherein said first and said second light emitting sources include light emitting diodes (LEDs) respectively of a first colour and a second colour which are not the same, said first and said second optical regions being generally covered with light of said first and said second colour, said combination optical region being a region covered with light resulting from mixing of light from said first and second light emitting sources.

8. Optical means according to claim 7, wherein the intensity of light of each of said first and second light emitting diodes are variable.

9. Optical means according to claim 7, wherein the axes of said first and second LEDs are generally parallel, said first, second and combination optical regions being formed by projection of light emitted from said LEDs, the cumulative area of said optical regions increases with the distance along the direction of light emission from said LEDs.

10. Optical means according to claim 7, wherein said first and second LEDs are connected to intensity controlling means for varying the light intensity of said LEDs.

11. Optical means according to claim 10, wherein the colour of said combination optical region is variable by varying the relative intensity of said first and said second LEDs.

12. Optical means according to claim 7, wherein the separation (D) between said first and second LEDs does not exceed 12 mm.

13. Optical means according to claim 12, wherein the separation between said combination optical region and the light emitting plane of the said LEDs is between D/3 and 3D.

14. Optical means according to claim 2, further including a third light emitting source, said third light emitting source being capable of producing light of a colour different from said first and said second light emitting sources, said third light source emits light to form a third optical region and co-operates with said first and said second light emitting sources to form a tertiary optical region, said selection means includes means to couple the upstream ends of said optical guides to optical regions including said tertiary optical region.

15. Optical means according to claim 14, further including a fourth light emitting source, said fourth light emitting source being capable of producing light of a colour different from said first and said second light emitting sources, said fourth light source emits light to form a fourth optical region and co-operates with said first, second and third light emitting sources to form a quaternary combination optical region, said selection means includes means to couple the upstream ends of said optical guides to optical regions including said quaternary optical region.

16. An article, means or arrangement including the optical means of claim 1.

17. An article including an optical means of claim 1, said article being a back-bag or a pair of shoes.

18. A Christmas decorative item including optical means of claim 1.

19. Optical means including an optical source, selection means and optical guiding means, said optical source includes means for producing a plurality of optical regions of different colours, said optical guiding means include a plurality of elongated optical guides for guiding light coupled to the upstream ends of said optical guides to their downstream ends, said selection means includes means for selectively aligning the upstream ends of said optical guides to one or a plurality of said optical regions, wherein said optical source includes at least a first and a second light emitting sources, said first and said second light emitting sources being disposed to form a first optical region, a second optical region and a combination optical region, said first and said second optical regions being formed by projection of light originating respectively from said first light emitting source and said second light emitting source, said combination optical region being formed by co-operative projection of light originating from both said first light emitting source and said second light emitting source, and each of said first and second LEDs has a viewing angle exceeding 90°.

20. Optical means including an optical source, selection means and optical guiding means, said optical source includes means for producing a plurality of optical regions of different colours, said optical guiding means include a plurality of elongated optical guides for guiding light coupled to the upstream ends of said optical guides to their downstream ends, said selection means includes means for selectively aligning the upstream ends of said optical guides to one or a plurality of said optical regions, wherein said optical source includes at least a first and a second light emitting sources, said first and said second light emitting sources being disposed to form a first optical region, a second optical region and a combination optical region, said first and said second optical regions being formed by projection of light originating respectively from said first light emitting source and said light emitting source, said combination optical region being formed by co-operative projection of light originating from both said first light emitting source and said second light emitting source, wherein said selection means includes partitioning means defining regions corresponding to at least one of said optical regions.

* * * * *